UNITED STATES PATENT OFFICE.

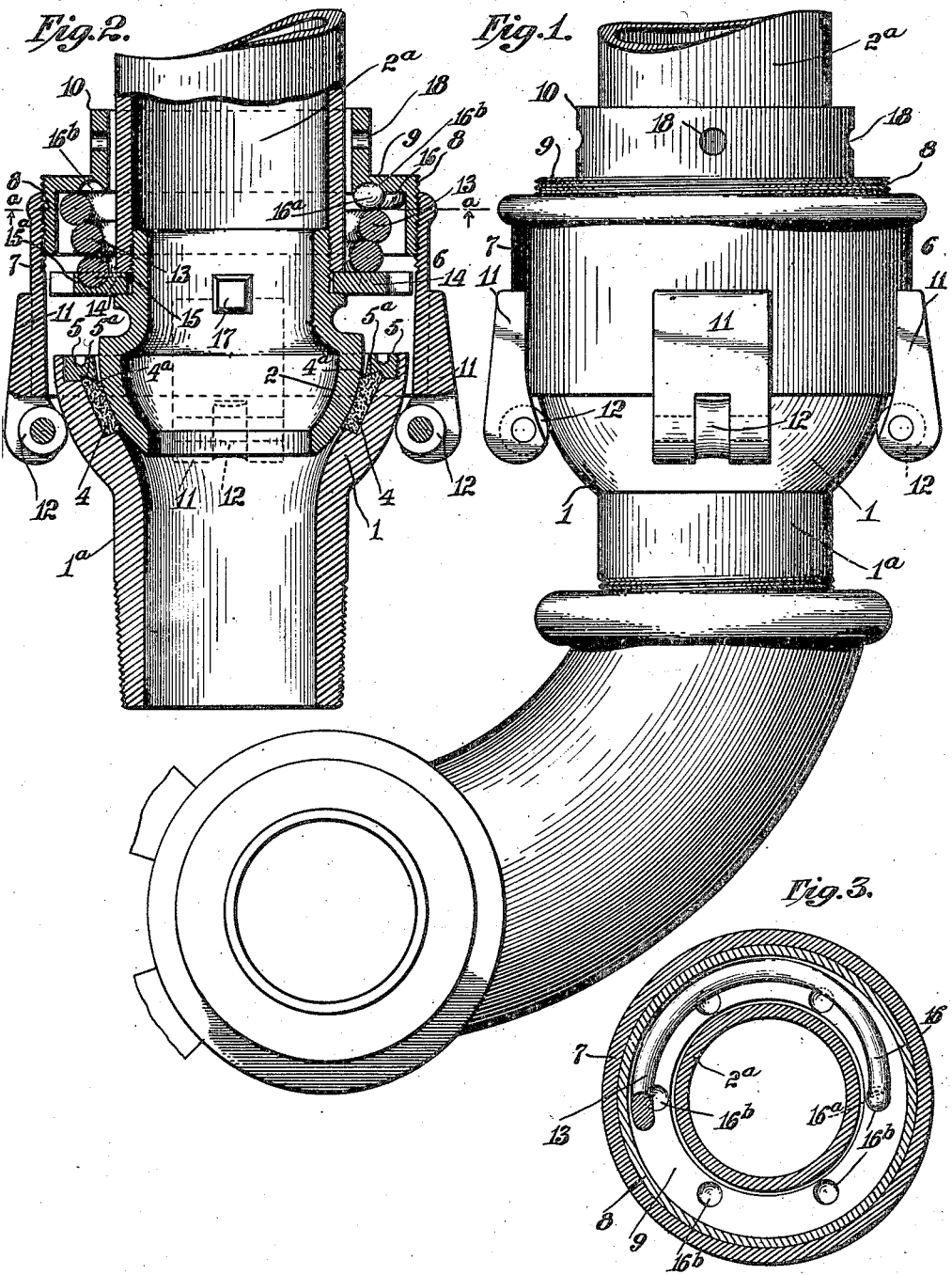

CHARLES FORTH, OF OTTAWA, ONTARIO, CANADA.

PIPE-JOINT.

1,154,984.   Specification of Letters Patent.   Patented Sept. 28, 1915.

Application filed May 22, 1913. Serial No. 769,133.

*To all whom it may concern:*

Be it known that I, CHARLES FORTH, a citizen of the United States, residing at Ottawa, in the Province of Ontario and Dominion of Canada, have invented certain new and useful Improvements in Pipe-Joints, of which the following is a specification, reference being had therein to the accompanying drawing.

This invention relates to pipe joints, the object of the invention being to provide a joint which will permit the parts to be moved freely relatively to each other in all directions, while at the same time maintaining a fluid-tight connection between them.

The invention is designed with special reference to the application of the joint to railway train-pipe systems for air or steam, to enable pipe terminals of metal to be employed between the cars instead of rubber; and the invention consists of a joint of the "ball-and-socket" type, comprising two members seated one within the other so that they may rock relatively to each other in all directions, in combination with improved means for maintaining the members in fluid-tight contact while permitting their relative swiveling action.

The invention also consists of a gasket applied to the socket member and confined therein by improved means so as to produce a fluid-tight seal between the parts.

The invention consists also of certain improved details of construction and combination of parts in the general organization, hereinafter set forth and claimed.

In the accompanying drawings, Figure 1 is a side elevation of my improved pipe joint; Fig. 2 is a central longitudinal section through the same; and Fig. 3 is a horizontal transverse section, partly in elevation, on the line *a—a* of Fig. 2, as viewed in the direction of the arrow in said figure.

Referring to the drawings, 1 represents the socket member of the joint provided with a coupling neck 1ª, and 2 represents the ball member seated in the socket member and provided with a neck 2ª, the contacting surfaces of said members being curved in the arcs of circles struck from a common center so that they may move relatively to each other in all directions.

The surface of contact of the socket member with the ball member is formed by a ring-like gasket 4, preferably of hardened graphite or equivalent material, which gasket is seated in an annular recess in the interior of the socket member and is confined firmly and fixedly therein by means of a confining nut 5, screwed into the open end of the member. The outer end of the gasket is inclined or beveled as at 4ª, and this beveled end is seated in a correspondingly formed annular recess 5ª in the inner end of the confining nut, the construction being such that when the confining nut is screwed home tightly to its seat, the beveled surface of its recess coöperating with that on the gasket, will wedge and draw the gasket back firmly and fixedly onto its seat, but will leave its curved bearing face projecting slightly beyond the interior of the socket member in position to contact with the bearing surface of the ball member. As a result of this construction, there is no risk or liability of the gasket becoming loose or displaced after being once permanently set to its final position by the clamping action of the nut, the pressure of the ball member against the socket member tending to seat and hold the gasket the more tightly in place, and the contacting surfaces forming a very effective fluid-tight joint between the parts without interfering with their freedom of movement in all directions.

The two members are held together with a spring action by means of a sleeve-like frame 6 loosely surrounding the members of the joint some distance from the same so as to leave an annular space between the neck of the ball member and the frame. This frame is in two endwise separable sleeve-like sections, 7 and 8, the section 7 being threaded internally at one end and screwed onto the exteriorly threaded end of the section 8, which latter is reduced in diameter beyond its threaded end, thereby producing an annular shoulder 9 and an annular extension 10. The opposite end of the section 7 of the frame is provided with a plurality of lugs 11, four in the present instance, spaced at equal intervals around the end of the sleeve, and on each of these lugs is mounted an anti-friction element in the form of a roller, 12, which several rollers bear against the exterior of the socket member (which is curved spherically concentrically with its internal surface) and are concaved longitudinally so as to conform to said surface in a circumferential direction, this construction permitting the socket member to shift around on the ball member in all directions with a minimum of friction. Situated in the annular space between the sleeve-like frame and the neck 2ª is a strong coiled spring 13, one end of which bears against the shoulder 9, while its opposite end bears against an annular projection or flange 14 sustained by and extending outwardly from the neck 2ª adjacent the ball member 2, the tendency of the spring in expanding being to force the frame 6 and its rollers longitudinally relatively to the ball member, with the result that the rollers, by their engagement with the external spherical surface of the socket member, will draw the same firmly and yieldingly against the ball member and will cause their contacting surfaces to maintain a fluid-tight joint.

In assembling the parts of the joint, the spring is seated in the enlarged end of the section 8 of the frame 6, the neck 2ª with the ball member is inserted in the section, with the flange 14 resting against the end of the spring. The socket member is then seated over the ball member, and the section 7 of the frame with its rollers, slipped over the neck 1ª, and the threaded end of the section is screwed onto the threaded end of the section 8 until the coils of the spring are forced together into contact, as shown, the rollers in this action forcing the socket member into firm engagement with the ball member. The parts of the joint are now in operative relations, and the ball and socket members may rock and tip in all directions relatively to each other around the common center of their contacting surfaces, while at the same time they may swivel relatively to each other about their longitudinal axis.

The coil of the spring which bears against the flange 14 has its end rounded and extended a slight distance longitudinally in the form of a finger 15, which is adapted to seat in any one of a number of sockets 15ª in the flange 14; and the end of the coil which bears against the shoulder 9 is extended inwardly, as at 16, within the main portion of the coil and is provided on its end with a finger 16ª adapted to seat in any one of a number of depressions 16ᵇ in the shoulder 9. This construction constitutes a connection between the frame 6 with its rollers, and the ball member of the joint, of such character that while normally these parts will be held against relative swiveling motion, yet under certain conditions, the extended ends of the spring will be disengaged from the depressions in the shoulder and flange and will permit the parts to turn relatively far enough to seat the ends of the spring into the next depressions. This construction forms in effect a circumferentially yieldable connection between the frame and ball member and thus provides for a swiveling action, either between the socket member and both the ball member and frame, in which case the frame and ball member connected by the spring would turn together; or between the socket member and ball member only, in which case the frame would be released from the ball member and would turn with the socket member and in relation to the ball member, these different actions occurring according to the different conditions encountered in the practical use of the joint.

The spring 13 has its coils of gradually decreasing diameters from one end to the other, and when the coils are forced into contact with each other, in assembling the parts of the joint, the coils will be offset relatively to each other, with their cross-sectional diameters overlapping each other slightly, and the spring will present a general conical form. If under these conditions, the spring becomes broken, the broken coils will forcibly enlarge and the spring will assume a general cylindrical form with the cross-sectional diameters of the coils disposed vertically in line, the effect of which will be to exert an end pressure against the flange and shoulder, with the result that the joint will continue to be effective even with a broken spring.

The extension 10 of the frame is provided with a number of holes 18 for the application of a spanner or similar tool for screwing the section within the other section 7; and the interior of the ball member is provided with oppositely located lugs 17 for the application of a tool to facilitate the assemblage of the parts of the joint.

In the foregoing description and in the accompanying drawings, I have disclosed my invention in the particular detailed form and construction which I prefer to adopt, but it will be manifest to those skilled in the art that these details may be variously modified and changed without departing from the limits of my invention; and it will be further understood that the invention is not limited to any particular form or construction of the parts, except in so far as such limitations are specified in the claims.

Having thus described my invention, what I claim is:

1. In a pipe joint, the combination of a socket member provided with an external spherically curved bearing surface, a ball member seated in the socket member and rockable therein universally, a surrounding frame, antifriction rollers mounted on said frame on horizontal transverse axes extending in a general circumferential direction and engaging said external bearing surface of the socket member, and a spring acting on the surrounding frame and ball member respectively and serving to hold the antifriction rollers in yielding engagement with the bearing surface and thus maintaining the members of the bearing in fluid-tight connection while permitting their universal relative movement.

2. In a pipe joint, the combination of a socket member provided with an external spherically curved bearing surface, a ball member seated in the socket member and rockable therein universally, a surrounding frame, antifriction rollers mounted in said frame on transverse axes extending in a general circumferential direction and engaging said bearing surface, said rollers being concaved so as to conform to the curvature of the bearing surface in a circumferential direction, and a spring acting on the frame and ball member respectively and tending to hold said parts in yielding engagement.

3. In a pipe joint, the combination of a socket member provided on its interior with an annular gasket seat sloping outwardly, a stiff gasket ring provided with an inner curved bearing surface, said ring being mounted in the seat, with its inner bearing surface projecting beyond the internal surface of the socket member, and said ring having on its outer edge at its inner side, an annular surface inclined outwardly at an angle to the slope of the seat, a confining nut screwed into the open end of the socket member and having in its inner end, an annular recess provided with a sloping surface adapted to engage the inclined surface on the gasket ring, said engaging surfaces acting, when the nut is screwed into the socket member, to draw the gasket ring back and seat the same permanently in final position in its annular seat, a ball member extending into the socket member in contact with the projecting bearing surface of the gasket ring, and means for maintaining said members in operative relations.

4. In a pipe joint, the combination of a socket member provided on its interior with an annular gasket seat, a stiff gasket ring provided with an inner curved bearing surface, said ring being mounted in the seat with its inner bearing surface projecting beyond the internal surface of the socket member, and said ring having on its outer edge at its inner side, an annular surface inclined outwardly, a confining nut screwed into the open end of the socket member and having on its inner end an annular surface corresponding in inclination to the inclined surface on the nut, and adapted to engage said surface, said engaging surfaces acting, when the nut is screwed into the socket member, to draw the gasket ring back and seat the same permanently in final position in its annular seat, a ball member extending into the socket member in contact with the projecting bearing surface of the gasket ring, and means for maintaining said members in operative relations.

5. In a pipe joint, the combination of a socket member, a ball member rockable therein, a surrounding frame loosely engaged with the socket member, and a coiled spring acting between the frame and ball member to draw the ball member and socket member together, said spring being so frictionally interlocked at its ends with said frame and ball member, that the ends of the spring may be disengaged by a relative circumferential movement of said latter parts.

6. In a pipe joint, the combination of a socket member, a ball member rockable therein and provided at intervals with separated shallow depressions, a surrounding frame provided at intervals with separated shallow depressions, and operatively engaged with the socket member, and a spring acting on the frame and ball member respectively and frictionally engaged at its opposite ends in one of the said depressions in the ball member and socket member respectively, whereby the ends of the spring may be disengaged from one set of depressions, and may be engaged with another set, by a relative circumferential movement of the parts.

7. In a pipe joint, the combination of a socket member, a ball member rockable therein, a surrounding frame operatively engaged with the socket member, and a coiled spring acting respectively on said frame and ball member, the coils of said spring being respectively of successively decreasing diameters, and the spring being sustained with said coils in contact with each other and offset relatively to each other; whereby in the event of breakage of the coils, the latter in expanding in the direction of their planes will increase the axial length of the spring and maintain the parts of the joint in operative relations.

In testimony whereof I have affixed my signature in presence of two witnesses.

CHARLES FORTH.

Witnesses:
T. A. BEAMENT,
A. GEORGE BLAIR.